US008604656B2

(12) United States Patent
Goertzen et al.

(10) Patent No.: US 8,604,656 B2
(45) Date of Patent: Dec. 10, 2013

(54) HIGH-TEMPERATURE THERMOSETTING POLYMERIC MATERIALS FOR ESP MOTOR APPLICATIONS

(75) Inventors: William Goertzen, Lawrence, KS (US); Gregory H. Manke, Overland Park, KS (US); Aider Matarrita, Olathe, KS (US); Melissa Ver Meer, Shawnee, KS (US)

(73) Assignee: Schlumberger Technology Corporation, Sugar Land, TX (US)

( * ) Notice: Subject to any disclaimer, the term of this patent is extended or adjusted under 35 U.S.C. 154(b) by 540 days.

(21) Appl. No.: 12/640,327

(22) Filed: Dec. 17, 2009

(65) Prior Publication Data

US 2010/0156215 A1 Jun. 24, 2010

Related U.S. Application Data

(60) Provisional application No. 61/139,034, filed on Dec. 19, 2008.

(51) Int. Cl.
H02K 15/12 (2006.01)
H02K 5/132 (2006.01)

(52) U.S. Cl.
USPC .................. 310/87; 310/260; 310/43; 29/596

(58) Field of Classification Search
USPC ................ 310/87, 43, 260; 29/596–598
See application file for complete search history.

(56) References Cited

U.S. PATENT DOCUMENTS

| 4,275,319 | A | * | 6/1981 | Davis, Jr. | 310/43 |
| 4,651,039 | A | * | 3/1987 | Yamamoto et al. | 310/87 |
| 4,833,354 | A | * | 5/1989 | Miller | 310/87 |
| 5,319,269 | A | * | 6/1994 | Bryant | 310/43 |
| 6,407,339 | B1 | * | 6/2002 | Rice et al. | 174/110 SR |
| 7,587,807 | B2 | * | 9/2009 | Bourqui et al. | 29/596 |
| 2006/0232143 | A1 | * | 10/2006 | Purvines et al. | 310/43 |
| 2007/0142547 | A1 | * | 6/2007 | Vaidya et al. | 524/847 |
| 2007/0181306 | A1 | * | 8/2007 | Tupper et al. | 166/302 |
| 2007/0199709 | A1 | | 8/2007 | Hooker et al. | |
| 2009/0058221 | A1 | * | 3/2009 | Liu | 310/260 |

OTHER PUBLICATIONS

D.A. Shimp, "Cyanate esters—an emerging family of versatile composite resins," Proceedings of the 34th Annual International SAMPE Symposium, May 1989.
W.K. Goertzen, M.R. Kessler, "Thermal Expansion of Fumed Silica/Cyanate Ester Nanocomposites," Journal of Applied Polymer Science, 2008, V109, pp. 647-653.

(Continued)

Primary Examiner — Tran Nguyen
Assistant Examiner — Leda Pham
(74) Attorney, Agent, or Firm — Jim Patterson

(57) ABSTRACT

An electric submersible pump (ESP) motor includes a polymer or ceramic component made by curing a thermosetting polymer in situ in the ESP motor, wherein the thermosetting polymer is selected from the group consisting of cyanate ester, bismaleimide, polyimide, benzoxazine, a preceramic polymer, and a mixture thereof, or the thermosetting polymer is a hybrid polymer having less than 50% by weight of an epoxy component and a second component selected from the group consisting of cyanate ester, bismaleimide, polyimide, benzoxazine, a preceramic polymer, and a mixture thereof.

15 Claims, 7 Drawing Sheets

(56) References Cited

OTHER PUBLICATIONS

W.K. Goertzen, X. Sheng, M. Akinc, M.R. Kessler, "Rheology and Curing Kinetics of Fumed Silica/Cyanate Ester Nanocomposites," Polymer Engineering and Science, 2008, V48, pp. 875-883.

W.K. Goertzen, M.R. Kessler, "Three-phase Cyanate Ester Composites with Fumed Silica and Negative-CTE Reinforcements," Journal of Thermal Analysis and Calorimetry, 2008, V93, pp. 87-93.

W.K. Goertzen, M.R. Kessler, "Dynamic Mechanical Analysis of Fumed Silica/Cyanate Ester Nanocomposites," Composites Part A: Applied Science and Manufacturing, 2008, V39. N5, pp. 761-768.

W.K. Goertzen, M.R. Kessler, "Thermal and Mechanical Evaluation of Cyanate Ester Composites with Low Temperature Processability," Composites Part A: Applied Science and Manufacturing, 2007, V38, pp. 779-784.

* cited by examiner

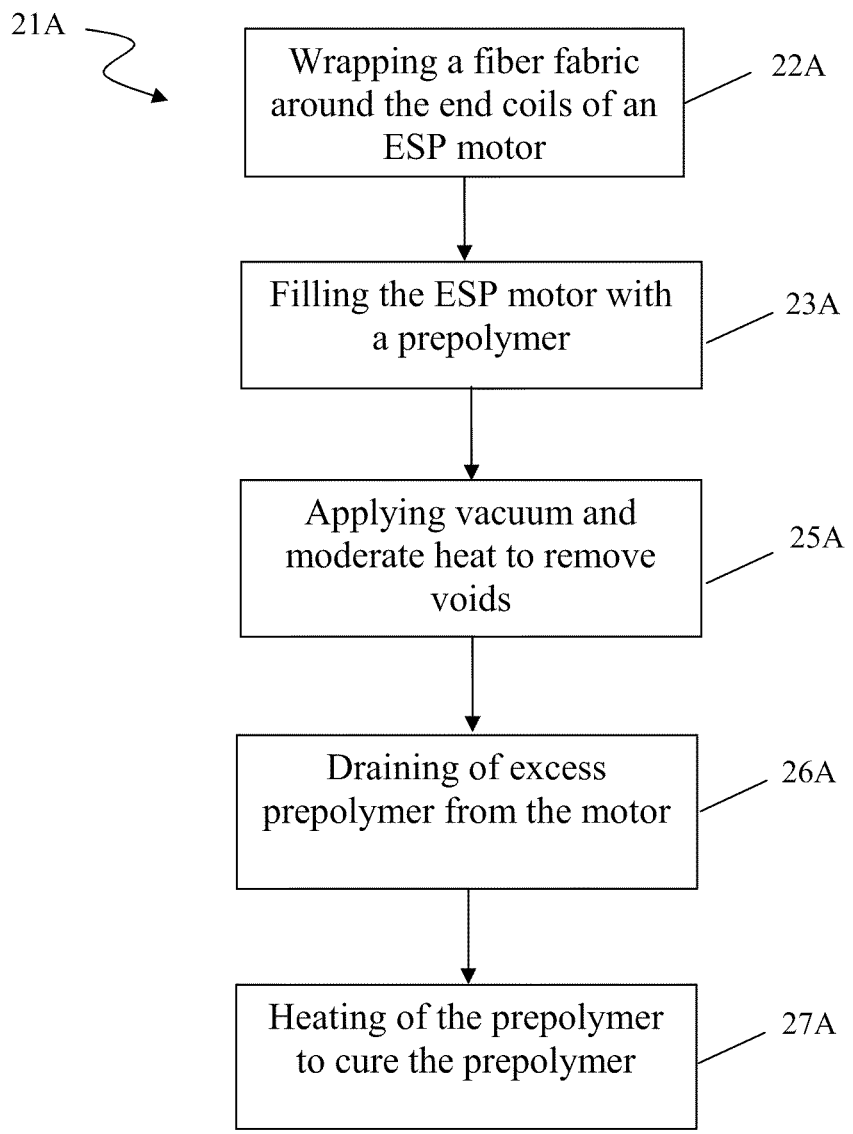

HIGH-TEMPERATURE THERMOSETTING POLYMERIC MATERIALS FOR ESP MOTOR APPLICATIONS

CROSS REFERENCE TO RELATED APPLICATIONS

This claims priority, under 35 U.S.C. §119(e), of the Provisional Patent Application No. 61/139,034, filed Dec. 19, 2008. This provisional application is incorporated by reference in its entirety.

BACKGROUND OF INVENTION

1. Field of the Invention

The present invention generally relates to electric submersible pumps (ESP), or other pumps, for downhole use in high temperature environments.

2. Background Art

In oil wells and the like from which the production of fluids is desired, a variety of fluid lifting systems have been used to pump the fluids to surface holding and processing facilities. One such pumping system is a submersible pumping assembly which is immersed in the fluids in the wellbore. A submersible pumping assembly typically comprises a pump and a motor. The motor drives the pump to pressurize and pass the fluid through production tubing to a surface location. The motor is typically driven by electric power. Such a pump is referred to as an electric submersible pump assembly (ESP).

FIG. 1 shows an ESP assembly 10, which is disposed in a wellbore 12 and suspended therein via a tubing 14 extending from the surface 16. The ESP assembly 10 may have, from bottom to top, an electric submersible motor 18, a seal section assembly 20, and a pump 22. The pump 22 may include an intake pump section 24 and a pump discharge head 26 that move a production stream 28 through production tubing 14 to the surface 16.

The motor 18 may be controlled at the surface by a switch board 34 with an optional variable speed device (VSD) via a cable 36, as one skilled in the art would be aware, a packer 38 may be used to isolate the production zone and to protect casing 40. The casing 40 may have casing perforations 42, which may allow reservoir production 44 to flow into the wellbore 12.

With the wells being drilled deeper and deeper, there is an increasing need to have ESPs that can withstand more and more harsh environments, such as higher temperatures and higher pressures. Therefore, ESP systems that can withstand high temperature are needed.

SUMMARY OF INVENTION

One aspect of the invention relates to electric submersible pump (ESP) motors. An ESP in accordance with one embodiment of the invention includes a polymer or ceramic component made by curing a thermosetting polymer in situ in the ESP motor, wherein the thermosetting polymer is selected from the group consisting of cyanate ester, bismaleimide, polyimide, benzoxazine, a preceramic polymer, and a mixture thereof, or the thermosetting polymer is a hybrid polymer having less than 50% by weight of an epoxy component and a second component selected from the group consisting of cyanate ester, bismaleimide, polyimide, benzoxazine, a preceramic polymer, and a mixture thereof.

Another aspect of the invention relates to methods of producing electric submersible pump (ESP) motors. A method in accordance with one embodiment of the invention includes applying a thermosetting polymer to a part in the ESP motor, wherein the thermosetting polymer is one selected from the group consisting of cyanate ester, bismaleimide, polyimide, benzoxazine, a preceramic polymer, and a mixture thereof, or the thermosetting polymer is a hybrid polymer having less than 50% by weight of an epoxy component and a second component selected from the group consisting of cyanate ester, bismaleimide, polyimide, benzoxazine, a preceramic polymer, and a mixture thereof; and heating the thermosetting polymer resin to cure the thermosetting polymer resin in the ESP.

Other aspects and advantages of the invention will be apparent from the following description and the appended claims.

BRIEF DESCRIPTION OF DRAWINGS

FIGS. 2A and 2B are flow diagrams illustrating methods in accordance with embodiments of the invention.

DETAILED DESCRIPTION

Figure 1:
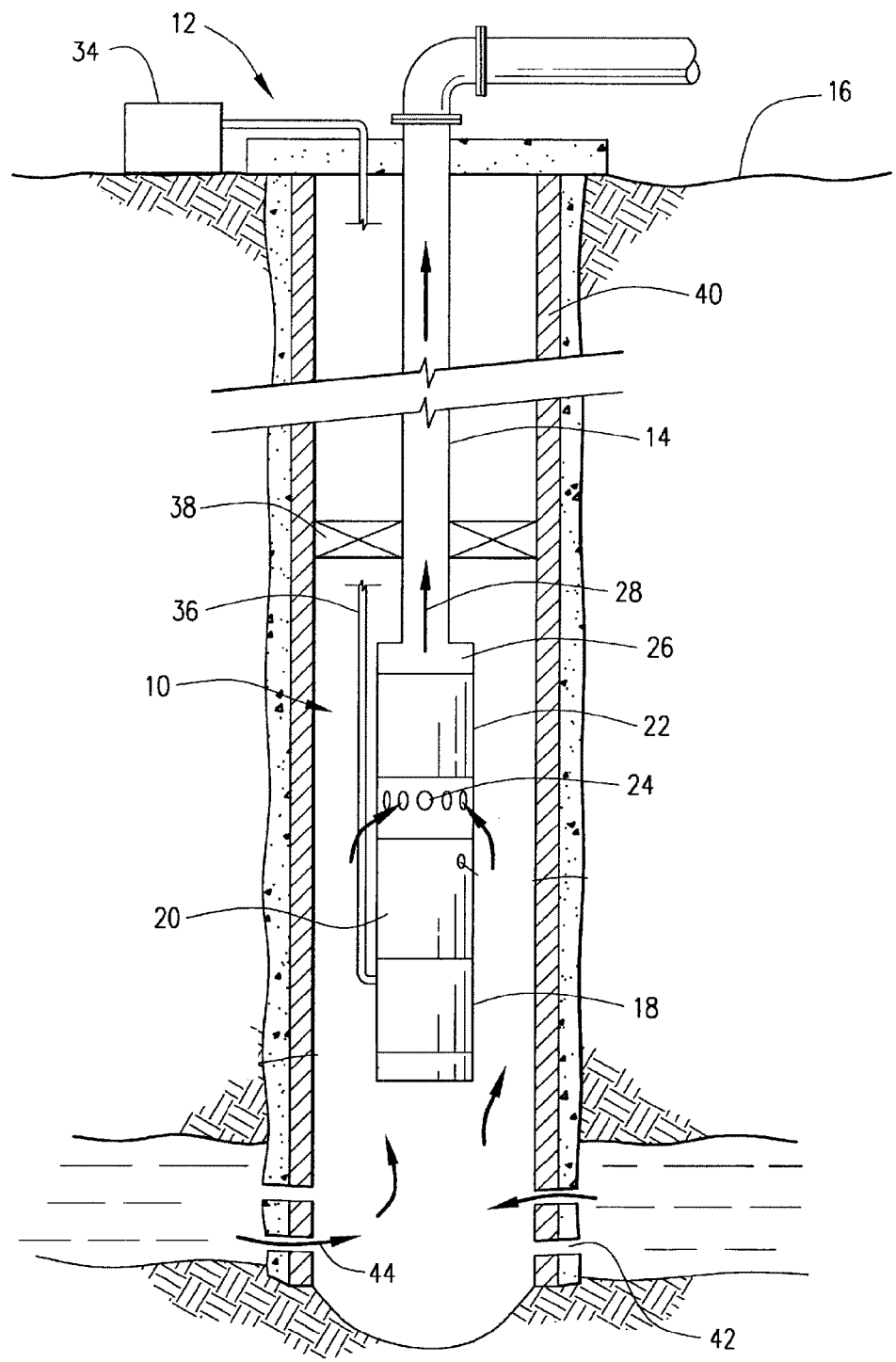
FIG. 1 is a diagrammatic view of an operation using a typical ESP assembly in a downhole.

Embodiments of the invention relate to ESPs for high temperature applications. An ESP in accordance with embodiments of the invention include parts made of thermosetting polymers that allow the ESP to withstand the high temperatures and/or provide good dielectric properties. Furthermore, the thermosetting polymers also permits these parts to be prepared and cured in situ, i.e., inside the ESPs.

In the following description, numerous details are set forth to provide an understanding of the present application. However, it will be understood by those skilled in the art that the present application may be practiced without many of these details and that numerous variations or modifications from the described embodiments are possible.

The following patents and applications are hereby incorporated by reference.

U.S. Pat. No. 6,407,339 B1, issued to Rice et al. discloses a high temperature electrical insulation for electrical windings for use in high temperature environments, such as superconductors and the like. The insulation comprises a cured preceramic polymer resin, which is preferably a polysiloxane resin. A method for insulating electrical windings comprises the steps of, first, applying a preceramic polymer layer to a conductor core, to function as an insulation layer, and second, curing the preceramic polymer layer.

U.S. Patent Application Publication No. 2007/0199709, by Hooker et al. discloses in situ processing of high-temperature electrical insulation. Specifically, methods are provided for producing a heater cable. An electrical conductor is coated with a preceramic resin. At least a portion of the coated electrical conductor is deployed into a operational location. The preceramic resin is pyrolyzed while the portion of the coated electrical conductor is in the operational location to convert the preceramic resin into a ceramic insulator disposed to electrically insulate the electrical conductor from the sheath.

U.S. Patent Application Publication No. 2007/0181306A1 by Tupper et al. discloses field application of polymer-based electrical insulation. Specifically, methods are disclosed for producing an insulated electrical conductor. Electrically uninsulated portions of respective electrical conductors are connected. A joint between the electrically uninsulated portions is coated with a preceramic resin, which is heated to cure the preceramic resin into a green-state insulator that substantially covers the joint.

Embodiments in accordance with the invention relate to internal components of ESP motors made of high-temperature thermosetting polymers and their composites.

The high-temperature thermosetting polymers may be defined as polymers that can withstand long-term (e.g., a day or longer) exposure to temperatures of 200° C. or greater. These polymers, for example, may include cyanate esters (also called polycyanates or polycyanurates), bismaleimides, polyimides, and benzoxazines. In some embodiments of the invention, these high-temperature polymers may be used together with epoxies. However, such hybrid polymers would have less than 50% by weight of the epoxy component.

For example, cyanate esters (such as those described in "Cyanate esters—an emerging family of versatile composite resins." by D. A. Shimp in the Proceedings of the 34$^{th}$ Annual International SAMPE Symposium. May, 1989) are a unique class of high-temperature thermosetting polymers because they have excellent thermal and mechanical properties. Cyanate ester prepolymers are characterized by cyanate functional groups, which may coordinate during polymerization to form triazine rings. These rings link the three-dimensional structure of the polymer (e.g., cyclotrimerization). Cyanate esters have been shown to have excellent mechanical, thermal, themomechanical, and rheological properties. See e.g., Goertzen, W. K. and Kessler, M. R., "Thermal Expansion of Fumed Silica/Cyanate Ester Nanocomposites," Journal of Applied Polymer Science, 2008, v 109, pp 647-653; Goertzen, W. K., Sheng, X., Akinc, M., and Kessler, M. R., "Rheology and Curing Kinetics of Fumed Silica/Cyanate Ester Nanocomposites," Polymer Engineering and Science, 2008, v 48, pp 875-883; Goertzen, W. K. and Kessler, M. R., "Three-phase Cyanate Ester Composites with Fumed Silica and Negative-CTE Reinforcements," Journal of Thermal Analysis and Calorimetry, 2008, v 93, pp 87-93; Goertzen, W. K. and Kessler, M. R., "Dynamic Mechanical Analysis of Fumed Silica/Cyanate Ester Nanocomposites," Composites Part A: Applied Science and Manufacturing, 2008, v 39, n 5, pp 761-768; and Goertzen, W. K. and Kessler, M. R., "Thermal and Mechanical Evaluation of Cyanate Ester Composites with Low Temperature Processability," Composites Part A: Applied Science and Manufacturing, 2007, v 38, pp 779-784.

However, cyanate esters can be hydrolyzed at high temperatures, leading to their poor performance in hot/wet conditions. Therefore, cyanate esters are generally not used for high temperature applications where water can be present. In particular, they are not used for downhole applications in the oil and gas industry because of their susceptibility to hydrolysis at high temperatures. Nevertheless, cyanate esters may be excellent candidates for applications in hot/dry environments, i.e., when moisture can be excluded Because polyimides and bismaleimides share similar chemistry as cyanate esters, these polymers are also susceptible to degradation in hot/wet environments Likewise, these polymers may also exhibit excellent properties in hot/dry environments, i.e., in the absence of moisture.

The high-temperature polymers mentioned above are found to be excellent candidates for ESP motor applications, especially for the internal components of the ESPs. Such internal components may include, for example, the motors, which are usually isolated from the well environment. To eliminate any moisture from the internal environment of the ESP, the motors may be dried and vacuumed before they are filled with motor oil.

In addition to their desirable properties, these polymers (e.g., cyanate esters, polyimides, and bismaleimides) are inherently dielectric materials. The dielectric property may provide additional functionality to these materials. Thus, these polymers may be used in applications where both structural support and electrical insulation are desired.

Embodiments of the invention may also include polymer-based ceramics. Polymer-based ceramics are sometimes called preceramic polymers or polymer-derived ceramics (PDCs). Preceramic polymers are those having a chain of inorganic elements capable of forming ceramics (e.g., carbides, borides, nitrides, silicides, aluminum oxides, zirconium oxides, etc.) with organic appendages. When cured at a sufficiently high temperature, the organic appendages on the preceramic polymers are shed to leave an amorphous network of inorganic elements, which may be referred to as a green-state of ceramics (i.e., green ceramics). Subsequent heating at a higher temperature would convert the green ceramics into crystalline ceramics.

In accordance with embodiments of the invention, the preceramic polymers may be used in various components in an ESP. The preceramic polymers may be used in a green ceramic state (pre-ceramic state) in various part of an ESP. These green state preceramics can then be pyrolyzed in situ to form the ceramic materials, which can function as physical supports and/or insulators. The green-state preceramic may be obtained by heating the polymer at a suitable temperature, e.g., between 125 and 200° C. These green-state preceramics can then be converted into ceramics by heating at a suitable temperature, e.g., between 200 and 1000° C., preferably between 750 and 1000° C.

Like the polymers described above, the polymer-based ceramics also have the additional benefit of being dielectric materials. Therefore, they can be beneficial when physical supports and insulations are desired.

Another important benefit of using high-temperature polymeric materials relates to their ability to be processed in situ. Cyanate esters, bismaleimides, polyimides, benzoxazines, and preceramic polymers may be initially in a prepolymer form having a viscosity that depends on the temperatures and the chemistry of the polymers. For example, the prepolymers may be a solid at ambient temperatures, but may have a very low viscosity at certain temperatures prior to curing. Regardless, these polymers will react with heat (and in some cases with addition of catalysts) to cure and produce rigid, crosslinked polymers having excellent mechanical properties. The low viscosity or moldability of these prepolymers or preceramic polymers can facilitate their use in tight spaces. Note that, for the preceramic polymers, the materials may be eventually converted into ceramics.

Because of their capabilities of being processed in situ, these high-temperature polymeric materials may be processed many ways to make dielectric, structural, or structural-dielectric components in ESP motors, which may not be possible using other materials, such as conventional ceramics or thermoplastic polymers. For example, these polymers can be used to fill the voids or crevices in snug fits before they are cured in situ. The resultant components will not leave any void in the final structure, resulting in a more robust support and/or insulation. This would not be possible if the polymers are preformed and then machined for the desired shapes.

In accordance with embodiments of the invention, these high-temperature thermosetting polymers may also be combined with a wide variety of reinforcing fillers, which may improve the properties of the polymers, e.g., mechanical, dielectric, and processability. These reinforcing fillers may include continuous fibers, woven continuous fibers, or short fibers, such as carbon, Kevlar® (aramid), glass, quartz, or Spectra® (for dielectric structures, glass, quartz, and Spectra® may be preferred). Discontinuous reinforcements (non-fibrous) may include a variety of particulate fillers having various geometries, e.g., micro-sized or nano-sized particles, platelets, and tubes. These particulate fillers may include ceramics (e.g., fumed silica, fused silica, mesoporous silica, zirconia, alumina, and quartz), clays, and carbon based materials (e.g., carbon black, graphite, exfoliated graphite, carbon nanotubes, and buckyballs).

Figure 8:
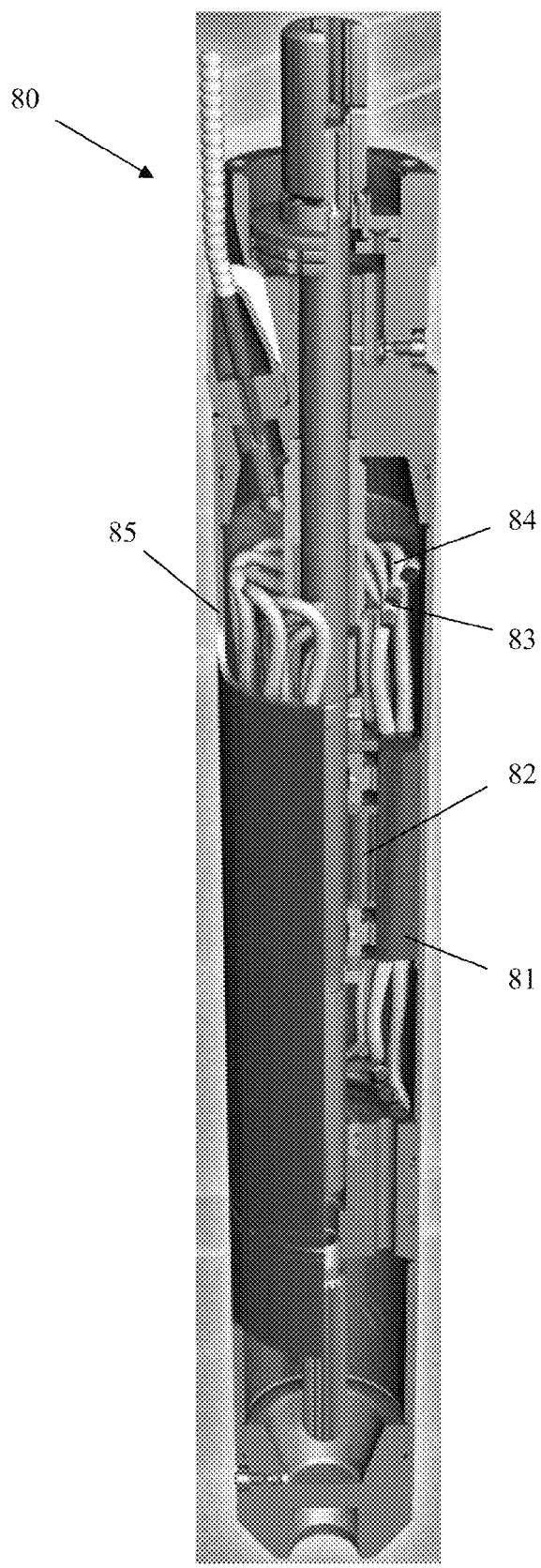
FIG. 8 shows a diagram illustrating an ESP motor in accordance with one embodiment of the invention.

Embodiments of the invention may be applied to several internal components in ESPs, using the materials described above. For example, these materials may be used in an ESP motor in the following parts and components:

Stator fills (or "varnish"): for stabilization and insulation of coils
Fiber-reinforced composites: for stabilization of end coils
Phase barrier papers
Housing insulation layers
Thermally cured magnet wire insulation (random or formed windings)
Lead wire insulation
Lead wire splice insulation
Motor Lead Extensions (MLEs)
Component ties/stabilization FIG. 8 shows an example of a motor that may be used in an ESP assembly. The particular embodiment shown in FIG. 8 is the Dominator™ motor from Schlumberger Technology Corporation (Sugar Land, Tex.). However, most motors suitable for use in ESPs would have similar components. As shown in FIG. 8, the motor 80 has a housing 85 that houses a stator 81 and a rotor 82. The stator 81 has windings of conductive wire 83, which has polymer insulator coatings 84. The high-temperature polymers described above may be used to insulate the conductive wire or the windings on the stator or the rotor. In addition, the high-temperature polymer may be used to fill the voids between coils to stabilize the coils or to coat the housing to provide an insulating layer. One of ordinary skill in the art would appreciate that there are many other applications that the high temperature polymers described above may be used in an ESP.

Embodiments of the invention will be further illustrated with the following examples. One skilled in the art would appreciate that these examples are for illustration only and other modifications or variations are possible without departing from the scope of the invention.

EXAMPLE 1

Figure 2B:
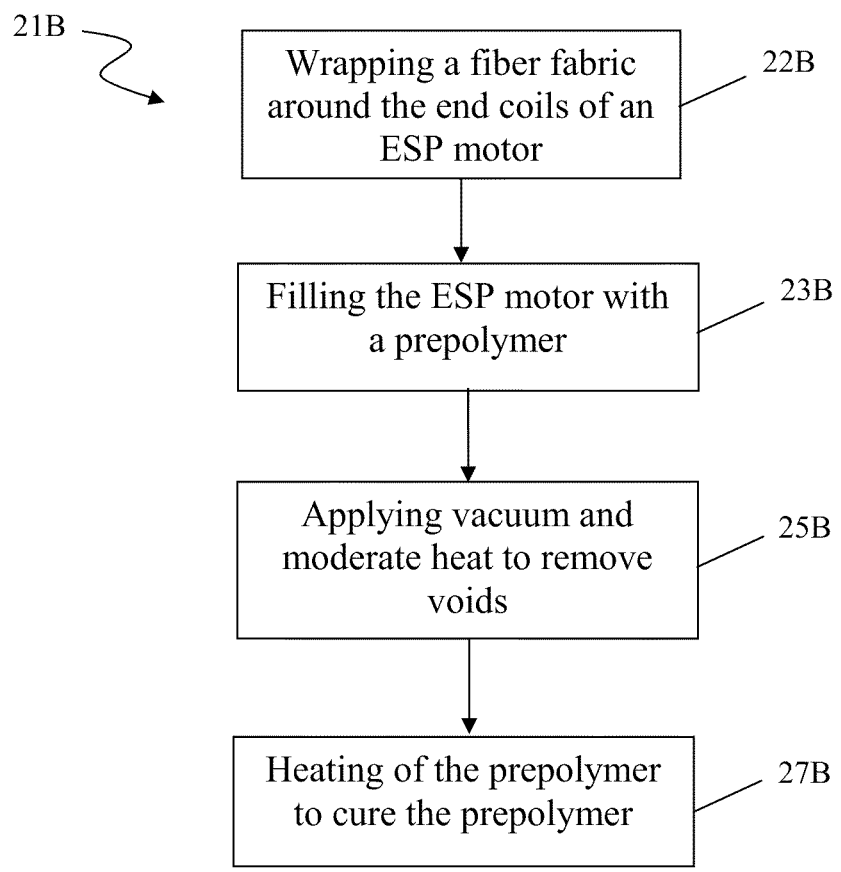

To stabilize the coil ends of ESP motor stators, a stator fill or "varnish" is often employed. FIG. 2A shows a method 21A in accordance with one embodiment of the invention ("varnish"). The method may include wrapping a fiber fabric around the end coils of an ESP motor (step 22A), followed by filling the ESP housing with a prepolymer (step 23A), and applying vacuum and moderate heat to remove voids (step 25A). This is followed by draining of excess prepolymer from the motor (step 26A), followed by heating the prepolymer to cure the prepolymer (step 27A). FIG. 2B shows an alternative method 21B (called a stator fill), where the prepolymer is not drained from the motor prior to cure. The method may include wrapping a fiber fabric around the end coils of an ESP motor (step 22B), followed by filling the ESP housing with a prepolymer (step 23B), applying vacuum and moderate heat to remove voids (step 25B), and then heating the prepolymer to cure the prepolymer (step 27B).

The materials currently used in the art (epoxies, polyesters, vinyl esters, etc.) are limited in their upper temperature limit. Therefore, the high-temperature polymers of the invention may be used in their place to achieve a high-temperature varnish. In addition, the high-temperature polymers may provide additional electrical insulation and eliminate the need for any other type of coil retention system.

EXAMPLE 2

In certain situations, it may not be practical to apply a varnish coil retention system to the stator or employ a complete stator fill. Embodiments of the invention include alternative methods using polymer composite materials as in situ coil retention systems. The methods may include wrapping a polymer composite around the end coils inside an ESP housing and curing the polymer composite in situ to provide a rigid structure that limits movement of the coils. This may be accomplished by using either separate resins and fiber fabrics or pre-impregnated fiber fabrics, called prepreg. Note that the prepolymer resins on the prepreg may be slightly cured, thus, allowing them to be handled with the fabrics and flexible sheets of materials.

Figure 3:
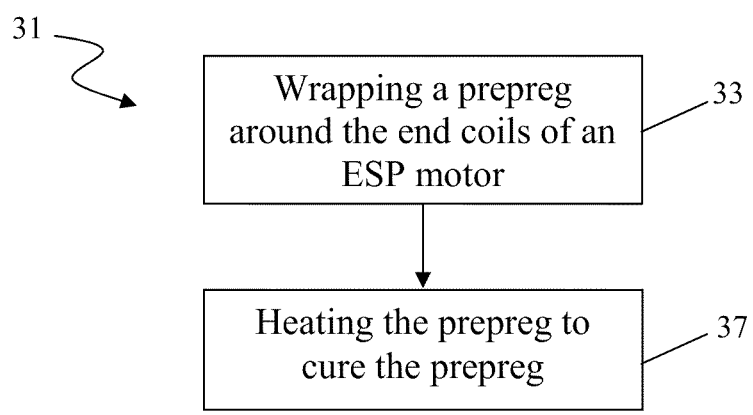
FIG. 3 is a flow diagram illustrating a method in accordance with another embodiment of the invention.

FIG. 3 shows a method 31 in accordance with one embodiment of the invention. The method 31 may allow the materials to be applied to end coils in one step. For example, it may include wrapping a prepreg around the end coils of an ESP motor (step 33), followed by treatment at an elevated temperature to cure the prepreg (step 37).

Figure 4:
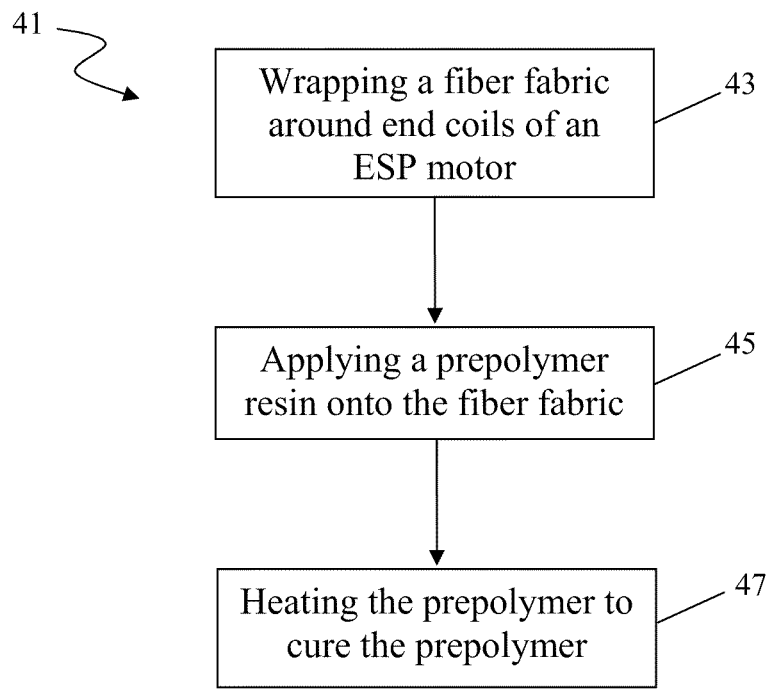
FIG. 4 is a flow diagram illustrating a method in accordance with another embodiment of the invention.

FIG. 4 shows an alternative method 41 in accordance with another embodiment of the invention. The method 41 may include wrapping fiber fabric materials around the end coils of an ESP motor (step 43), applying the prepolymer resins onto the fiber fabric (step 45), and followed by heat treatment to cure the prepreg (step 47).

The currently used resin systems include epoxies, polyesters, vinyl esters, etc. These resin systems may not withstand the high temperatures in many ESP applications because of their low glass transition temperatures and their susceptibility to degradation even at moderate temperatures. For the composites of the invention, a high-temperature prepolymer matrix with a dielectric fiber fabric (such as glass, quartz, or Spectra®) may be used either in prepreg form or as separate components.

In certain cases, shrinking polymeric tapes may be applied around the prepolymer composite wraps to consolidate the composites during curing. For this purpose, shrinking polymers including polyester, fluoropolymers, or polyimide may be used in conjunction with the high-temperature polymeric composites.

EXAMPLE 3

To separate the three phases of magnet wires in the ESP motors, electrical insulation may be used between each of the end coils. In certain cases, Examples 1 and 2 may provide adequate insulation. However, when that is not the case, high-temperature polymer prepregs, which use a high-temperature prepolymer matrix having a dielectric fiber fabric (such as glass, quartz, or Spectra®), may be applied between these phases.

Figure 5:
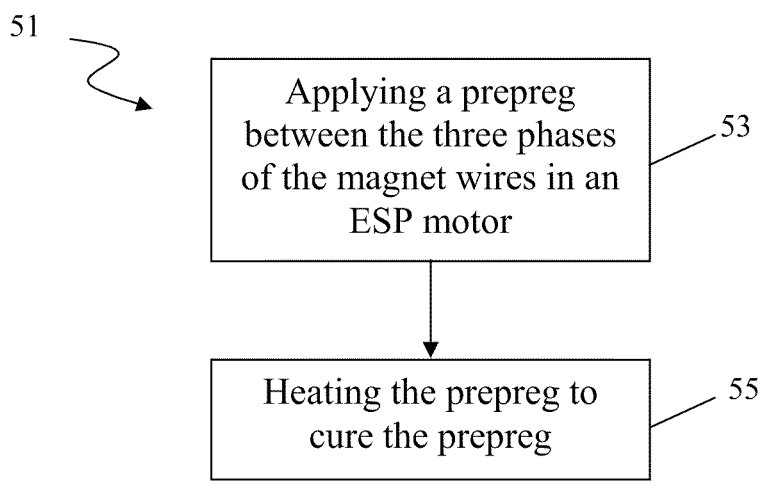
FIG. 5 is a flow diagram illustrating a method in accordance with another embodiment of the invention.

FIG. 5 shows a method 51 in accordance with one embodiment of the invention. The method 51 may include applying prepregs, as a phase barrier, between the three phases of the magnet wires in ESP motors (step 53), and followed by heating the prepregs to cure the prepreg (step 55). This process may be performed along with the coil retention systems as described in Example 2. This process may also be carried out with or without an internal layer of polyimide or Kapton® film sandwiched between the layers of prepregs.

EXAMPLE 4

Similar to Example 3, additional electrical insulation may be installed between the end coils and the motor housing. This process may be accomplished using the same materials as described in Example 3.

EXAMPLE 5

Magnet wire insulation may contain composite materials based on high-temperature polymers. The dielectric properties and in situ processability of these materials may allow applications of high-temperature polymer prepregs prior to motor winding, and followed by cure of the composite prepreg after winding.

Figure 6:
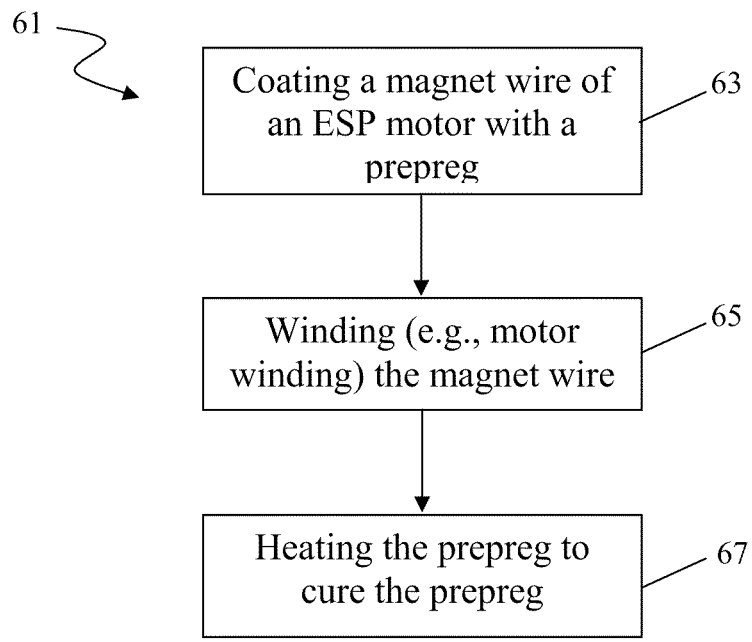
FIG. 6 is a flow diagram illustrating a method in accordance with another embodiment of the invention.

FIG. 6 shows a method 61 in accordance with one embodiment of the invention. The method 61 may include coating a magnet wire of an ESP motor with a prepreg (step 63), winding the magnet wire (e.g., motor winding) (step 65), and followed by heating the prepregs to cure the prepreg (step 67).

In accordance with a variation of the method described in FIG. 6, a composite material (e.g., prepregs) may be molded around magnet wire conductors, making "plug-in" sections for both the stator and the end coil sections. This process may be accomplished without the need of using the traditional, labor-intensive motor winding process.

In accordance with another embodiment of the invention, the magnet wire conductors may be wrapped with a glass or quartz fiber fabric prior to the installation of the magnet wires. The high-temperature polymer resins may then be transferred into gaps between the fibers, the magnet wire conductors, and the laminations. This process may be used for either section of the magnet wire bundles. It may be accomplished by filling the entire motor with resins under vacuum pressure. This strategy may also be used after wrapping the preceramic polymer prepregs around the conductors, such that the low viscosity prepolymer resins may be used to fill the small pores in the ceramics caused by pyrolysis of the preceramic polymer.

EXAMPLE 6

Similar methods may be used as in Example 5 shown above for the electrical insulation on the lead wires from the magnet wires to the MLE (motor lead extension).

EXAMPLE 7

The in situ processability of high-temperature polymers and their composites may be applied to electrically insulate splices between the magnet wires, lead wires, and MLEs.

EXAMPLE 8

Figure 7:
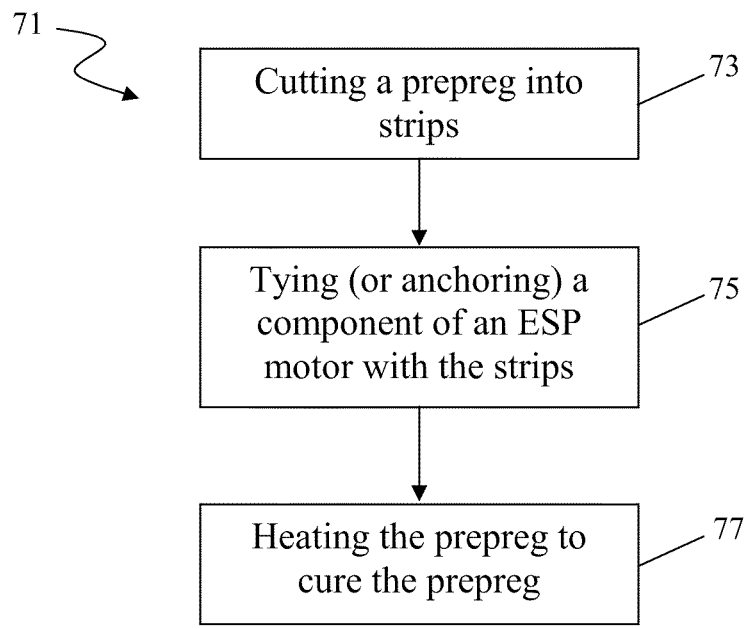
FIG. 7 is a flow diagram illustrating a method in accordance with yet another embodiment of the invention.

The in situ processability of the high-temperature polymer prepreg materials may be used in the following manner. For example, FIG. 7 shows a method 71 in accordance with one embodiment of the invention. The method 71 may include cutting a prepreg into strips (before cure, the prepreg is flexible) (step 73), tying (or anchoring) the components in an ESP motor (step 75), and followed by pyrolizing the prepreg to cure the prepreg (step 79). After cure, the rigid composites may provide structural support for these components. Another embodiment of the invention may include using the prepreg strips to tie back lead wires.

Advantages of embodiments of the invention may include one or more of the following. Methods of the invention may provide both electrical insulation and structural support for the internal components of ESPs used in a high temperature downhole environment, thus, extending the life of ESP motors and raising the service temperature. In addition, methods of the invention may be performed in situ, thus, allowing many ways to make dielectric, structural, or structural-dielectric components in ESP motors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An electric submersible pump (ESP) motor comprising:
a stator that comprises three different phases of magnet wires having end coils, fiber electrical insulation disposed between the end coils of the three different phases and a stator fill, in contact with at least the fiber electrical insulation, the stator fill made by curing a thermosetting polymer in situ in the ESP motor, wherein the thermosetting polymer comprises cyanate ester.

2. The ESP motor of claim 1, wherein the fiber comprises at least one fiber selected from a group consisting of a continuous fiber and a woven continuous fiber.

3. The ESP motor of claim 1, further comprising a non-fibrous filler that comprises at least one material selected from the group consisting of a ceramic, a clay, and a carbon-based material.

4. The ESP motor of claim 1, wherein the stator fill is heat-resistant to a temperature of at least 200° C.

5. A method of producing an electric submersible pump (ESP) motor, comprising:
applying fiber electrical insulation to a stator that comprises three different phases of magnet wires having end coils, the fiber electrical insulation disposed between the end coils of the three different phases;
applying a thermosetting polymer as a stator fill to at least the fiber electrical insulation, wherein the thermosetting polymer comprises cyanate ester; and
heating the thermosetting polymer to cure the thermosetting polymer in the ESP to structurally support and to electrically insulate the three different phases of magnet wire of the stator.

6. The method of claim 5, wherein the applying fiber electrical insulation further comprises applying fiber electrical insulation to tie back and structurally support at least one lead wire for a respective one of the magnet wires.

7. The method of claim 5, wherein the applying fiber electrical insulation comprises applying a prepreg strip.

8. The method of claim 7, wherein the prepreg strip comprises a dielectric fiber fabric.

9. The method of claim 5, wherein the thermosetting polymer further comprises a filler, wherein the filler is at least one selected from the group consisting of a fibrous filler and a non-fibrous filler.

10. The method of claim 9, wherein the fibrous filler is at least one selected from the group consisting of a continuous fiber and a woven continuous fiber.

11. The method of claim 9, wherein the non-fibrous filler is at least one selected from the group consisting of a ceramic, a clay, and a carbon-based material.

12. The ESP motor of claim 1 wherein the thermosetting polymer further comprises bismaleimide.

13. The method of claim 5 wherein the thermosetting polymer further comprises bismaleimide.

14. An electric submersible pump (ESP) motor comprising:
 a stator that comprises
  three different phases of magnet wires having end coils,
  ceramic disposed between the end coils of the three different phases, the ceramic made by curing a thermosetting preceramic polymer in situ in the ESP motor from a green state to a crystalline state, and
  a stator fill, in contact with at least the ceramic, the stator fill made by curing a thermosetting polymer in situ in the ESP motor wherein the thermosetting polymer comprises cyanate ester.

15. The ESP motor of claim 14 wherein the thermosetting polymer further comprises bismaleimide.

* * * * *